3,077,446
REFERENCE ELECTRODE FOR pH METERS
Lambertus van den Berg, Ottawa, Ontario, Canada, assignor to National Research Council, Ottawa, Ontario, Canada, a body corporate of Canada
Filed June 15, 1959, Ser. No. 820,375
9 Claims. (Cl. 204—195)

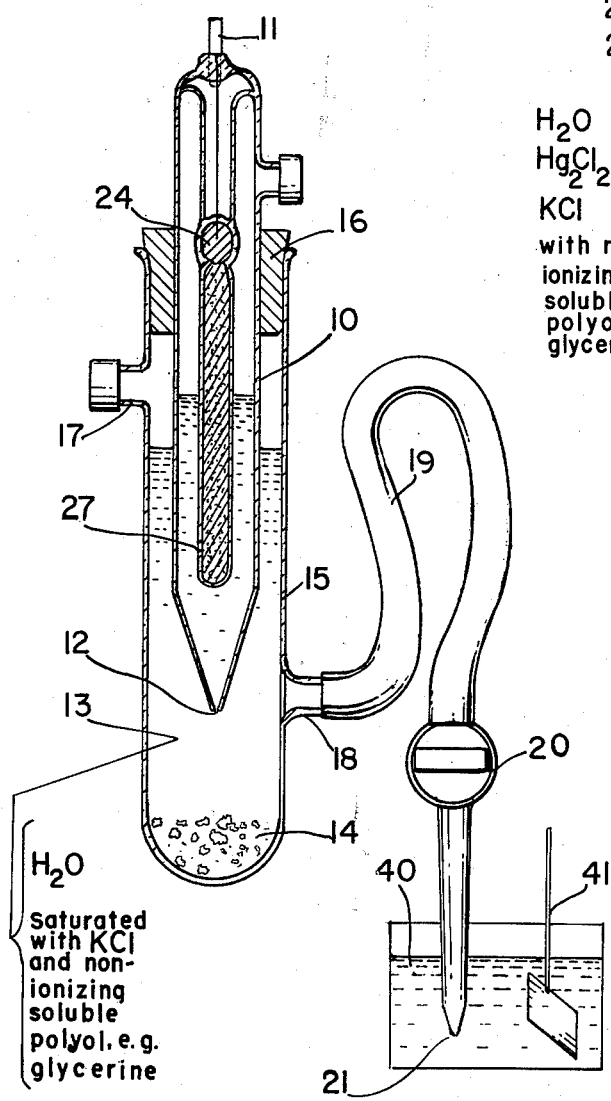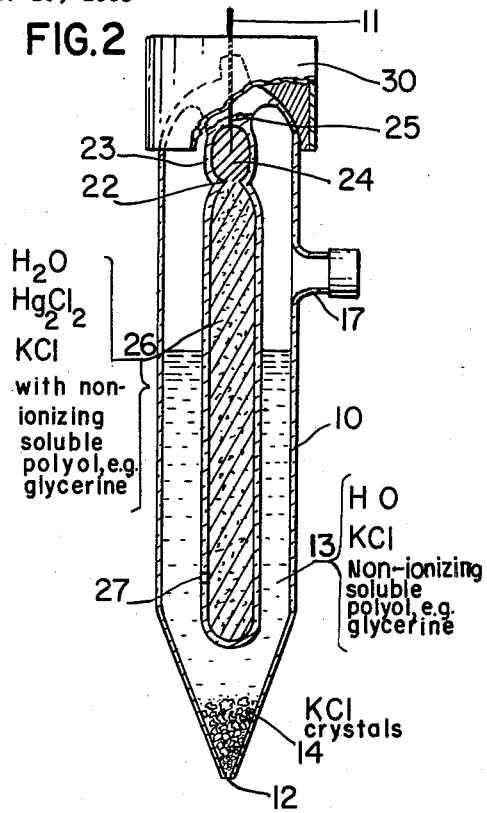

This invention relates generally to reference electrodes used for the determination of pH of solutions and particularly concerns modified calomel half-cells having utility for measurement of the concentration of hydrogen ions at temperatures lying in the range from about —40° C. to about 110° C.

The practice of the invention enables the determination of hydrogen ion concentration of aqueous substances and admixtures to be made over a range of temperatures extending well below the freezing point of water with substantially the same apparatus as has heretofore been employed, and with undiminished accuracy of measurements throughout that range of temperatures in which presently available apparatus is satisfactory. The invention also enables reproducible and substantially accurate determinations of pH to be made for such substances as frozen milk, foods, and biological matter at their usual hard frozen storage temperatures, as well as soils, plant roots and stems, and other natural substances in frozen states.

Apparatus in wide use for measurement of pH presently comprises a cell assembly in which a test electrode, and a reference electrode having a determinable standard potential, are connected by the solution to be tested and the difference of potential developed between the electrodes is equalized by the application of an externally supplied adjustable counter-voltage equal in magnitude to the cell E.M.F., to provide an indication of the pH. Some of the prior art test electrodes whose differences of potential with respect to a reference electrode in a solution may be related by known functions with the pH thereof, include the quinhydrone electrode, certain pure metal electrodes such as antimony and iridium, the hydrogen electrode, and the ion-conductive glass electrodes. As a reference electrode one-half of a standard Weston cell is used which may take any of various physical forms and which generally comprises a glass tube open at one end containing a quantity of pure mercury in contact with a paste of calomel ($Hg_2Cl_2$, i.e. mercurous chloride). A saturated bridge electrolyte solution of potassium chloride in water is placed in contact with the mercury and the calomel paste and affords a conducting path, provision being made for restricted flow of the electrolyte into the solution being tested, as through a glass tube having a closed end pierced by a capillary bore and dipping into the solution to be tested, or stopped by a porous plug. A platinum body immersed to contact only the mercury provides a means for electrically connecting the reference electrode with the measuring circuit. Such reference electrode has a stable determinable potential against which the variable potential of the test electrode is measured.

The eutectic point of a saturated solution of potassium chloride is —10.7° C. at which temperature solidification begins causing the reference electrode assembly to become inoperable. Therefore, while known solid form test electrodes such as the named metal or glass electrodes do not of themselves set the limit of the lowest temperature for measurements of pH, the reference electrode cannot be used for theoretical reasons below about —11° C. and in practice it usually fails to give reliable readings at some temperatures above —11° C. This limitation has handicapped seriously testing and control operations.

I am aware that the substance agar, which is a carbohydrate by nature, consisting mainly of the calcium salt of a sulfuric ester of d-galactose, has heretofore been proposed to be added to modify the viscosity of the KCl electrolyte solution to simplify transportation and handling. However, the eutectic point of a saturated solution of KCl in 1% agar is about —10.6° C. which is essentially the same as the eutectic point of an aqueous potassium chloride solution. Moreover the difference between the potentials of a standard calomel electrode and of an agar-modified electrode varies significantly over the practical pH range and introduces error over parts of the range, requiring additional corrections. These errors are apparently introduced by the adverse effects of the agar on the residual liquid junction potential between the bridge solution and the test solution (change of liquid junction potential when the electrode is transferred to a solution of different composition). The presence of agar is also likely to cause an increase in the suspension effect (effect of colloidal particles on the junction potential). It has been appreciated that both the residual liquid junction potential and the suspension effect may be important errors in pH measurement in any solution at low temperatures and in biological materials and concentrated solutions at all temperatures.

The present invention essentially consists in the addition to the KCl electrolyte solution in a calomel half-cell, of an organic compound of the class of compounds comprising the stable polyalcohols (polyols), and their stable non-ionizing derivatives which are completely miscible in saturated potassium chloride solution, in such amount as to substantially depress the freezing point of the resulting solution. Glycerol is a preferred additive, inasmuch as a reference electrode containing equal parts by weight of glycerol and water, and saturated with potassium chloride, can be used down to below —40° C. without risk of crystallization or solidification of the glycerol or water. Moreover such modified electrolyte solution also has an elevated boiling point enabling measurement to be made of the pH of solutions above 100° C. for example, up to about 110° C.

It is therefore a primary object of this invention to modify a standard reference electrode by depressing the freezing point of the solution surrounding the electrode, the bridge solution, or both, by admixture therewith of a non-ionizing organic substance which is completely miscible in saturated KCl and which is non-reactive with the cell constituents.

It is another object of the invention to provide a modified calomel half-cell reference electrode whose constituents do not solidify at temperatures well below the normal eutectic point of saturated potassium chloride solution, and which in addition is appreciably less affected by errors due to residual liquid junction potentials over a wide range of pH and temperature, and which is substantially less affected by suspended colloidal particles than the standard calomel half-cell electrode.

The practice of the invention in its preferred mode may be best understood by reference to the accompanying figures of drawing to which the following description relates, in illustration of modifications of known forms of reference electrodes or half-cells; these figures comprise:

FIG. 1, being an illustration of a reference electrode immersed in a bridge solution having a modifying compound dissolved therein; and FIG. 2, being a diagram of a known form of reference electrode whose electrolyte constituents include a dissolved modifying compound.

In a form of apparatus as shown in FIG. 1, the bridge solution 13 only is modified. The bridge electrolyte comprises an aqueous solution saturated in potassium chloride and a selected stable non-ionizing soluble organic compound such as glycerol, and is contained in a suitable reservoir 15, while an unmodified reference electrode 10 is supported with its lower apertured end immersed in the electrolyte. Unmodified reference electrode 10 is provided with a connecting lead 11 at its upper end, and has its lower end formed with capillary opening 12 communicating with the half-cell's bridge electrolyte, comprising a saturated aqueous solution of potassium chloride. A reference electrode suitable for the purpose is that designated as type 78026 V calomel reference electrode, commercially available from the Beckman Corporation.

Reservoir 15 may contain any suitable volume of solution, which will be hereinafter designated the "secondary" bridge electrolyte, inasmuch as this solution is in series with the half-cell's own or "primary" bridge electrolyte. An apertured plug 16 closes the upper end of the reservoir and supports the reference electrode. A short tubulation 17 extending from the side of the reservoir below the plug serves as a filling arm, and is suitably capped. The secondary bridge electrolyte comprises an aqueous solution saturated with KCl and with a modifying organic compound such as glycerol, the former being present in amount sufficient to provide a crystal bed 14. The reservoir is ported near its lower end as by a tubulation 18, with which an elongate conduit 19 is connected, having a small bore, for example 5 mm. diameter. The other end of the conduit is arranged to have a restricted flow aperture 21. A stopcock 20, or equivalent shut-off device, is provided along the length of the conduit to enable flow or seepage of secondary bridge electrolyte to be stopped when the half-cell is not in use.

In the measurement of pH, a sample 40 of a substance whose hydrogen ion concentration is to be determined, and whose temperature may be far below 0° C., is placed in contact with the tip 21 of the conduit, from which a minute flow of the secondary bridge electrolyte is allowed to exude. A test electrode 41 is also brought into contact with the substance, to complete an electromotive force cell. Measurement of the E.M.F. developed between lead 11 and the test electrode is performed in the conventional manner, and the net E.M.F. detected may be interpreted most readily by reference to a calibration graph or table including corrections for temperatures of each part of the cell.

Theoretically, a temperature gradient along the secondary bridge solution would contribute to the net E.M.F., the error generally increasing with the total temperature difference between substance 40 and solution 13. The calculation or measurement of the E.M.F. due to temperature difference being extremely difficult, the use of a calibration table obviates the problem and such table may be readily prepared by one familiar with the art of pH determination. Moreover the addition of a modifying organic compound such as glycerol according to the invention has been found by tests not to affect the magnitude of the gradient E.M.F. as determined by measurements with reference electrodes not so modified.

While only the secondary bridge electrolyte has been described as including a modifying compound according to the invention, all parts of a calomel half-cell may have a non-ionizing stable soluble polyol such as glycerol added thereto. Referring to FIG. 2, a reference electrode 10 similar to that shown in FIG. 1 has its fluid contents admixed with a modifying compound, permitting the entire half-cell to be cooled to a low temperature while remaining effective to produce a determinable reference E.M.F.

In the construction of such reference electrode a slender glass tube 22 is formed with a narrow necked bulb 23 at its upper end and a filling of mercury 24 placed therein. A conducting lead 11 extends through a press into the half-cell and is joined with platinum wire 25 in contact with the mercury. The remainder of the tube 22 is packed with a semi-solid aqueous paste 26 whose active ingredients are mercurous chloride ($Hg_2Cl_2$), and KCl. A stable non-ionizing, soluble polyol or a suitable derivative according to the invention is admixed thoroughly with the paste in amount sufficient to modify the freezing point. To prevent settling, the paste is loaded with a large volume percentage of an inert solid material such as asbestos, glass particles, or the like. An aperture 27 is formed in the side of tube 22 at its lower end to expose the paste in contact with the bridge electrolyte 13 surrounding its lower portion. A coaxially disposed tube 10 of larger diameter having its upper end sealed by cap 30 serves as a reservoir and extends below tube 22, tapering to a point, which is provided with a capillary bore 12. The bridge electrolyte is composed of water, an excess of potassium chloride, and a modifying organic compound, preferably the same as that admixed with paste 26.

The group of compounds useful as additives in the half-cell or in the bridge solution in contact with a solution to be tested, may generally be stated to comprise all water soluble polyalcohols, and in particular those which are completely soluble in saturated KCl solution in the desired temperature range. Polyalcohols can generally be described by the formula

$$R_1-(HCOH)_n-R_2$$

wherein $n$ is any whole number greater than 1, and $R_1$ and $R_2$ are radicals, for example H, $CH_3$, $C_2H_5$. In addition the stable, non-ionizing derivatives of the stable polyalcohols are also effective provided that they are completely miscible with saturated KCl solution in the desired temperature range. Such condensation products may generally comprise ethers of a polyalcohol:

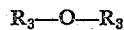

$$R_3-O-R_3$$

wherein $R_3$ is a polyalcohol having one OH-group removed from its molecule. Since $R_3$ always has more than two OH-groups, other molecules of the polyalcohol may be linked to the groups thereby to form larger molecule structures. Ethers of polyalcohols can also be represented by the formula

$$R_3-O-R_4$$

wherein $R_4$ is an alcohol other than $R_3$. Condensation products may further include compounds wherein $R_3$ itself is a condensation product of a polyalcohol.

In illustration of the foregoing, the relatively non-viscous, non-ionizing completely soluble and non-volatile stable polyalcohols and their derivatives useful in the realization of the invention include glycerol, ethylene glycol, diethylene glycol, and diethylene glycolmono-ethyl ether. The foregoing compounds are substantially non-reactive with the calomel half-cell constituents or with potassium chloride.

In a specific example, the addition of glycerol

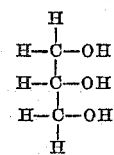

in proportions previously stated enables the cell or bridge solution to be cooled as low as −40° C. without risking crystallization. E.M.F. potential difference determinations made with such an electrode and a suitable low temperature glass electrode differed less than 2 mv. from readings made with an unmodified saturated calomel electrode in dilute solutions between pH 1 and pH 10, at temperatures between −10 to +40° C. as measured with a Beckman G pH meter.

The residual liquid junction potential measured between 0.01 N and 1.0 N hydrochloric acid at 25° C. was 11 mv. for the unmodified calomel electrode, but only 5 mv. for the modified electrode. The suspension effect measured with the modified electrode in soils varied between 0 and +4 mv. while the suspension effect measured with the unmodified electrode varied between —4 and +10 mv. Measurements with suspensions of ion exchange resins showed that the addition of glycerol to the electrode and bridge solutions produced a considerable decrease in the suspension effect.

It will be apparent from the foregoing that the addition of glycerol to the electrode and bridge solutions of calomel half-cell electrodes modifies the reference electrode to render it useful over a wider temperature range than has hitherto been possible, and achieves both a smaller residual liquid junction potential and a smaller error due to suspension effect. Table I is given in illustration of the residual liquid junction potential in 1.0 N HCl and in 1.0 N NaOH solution at room temperature. It will be apparent that with increasing weight proportion of each organic compound with respect to water, the mol./liter concentration of potassium chloride decreases. Depending on the application and the lowest temperature limit at which measurements are to be made, any system may be adjusted by choosing the appropriate percentage weight of the modifying compound. In general, equal parts by weight of modifying substance and water extend the operating range of the half-cell to temperatures below about —30° C. or lower.

While liquid modifying compounds of the class described are generally preferred as yielding modified electrolytes of low viscosity, it is also contemplated that relatively viscous solutions of non-ionizing polyols and their derivatives may be provided for the half-cell electrolyte, the primary bridge electrolyte or the secondary bridge electrolyte for the purpose of rendering the apparatus more readily movable.

Although the foregoing description has been restricted to a discussion of calomel reference electrodes, it is to be understood that other half-cells having determinable E.M.F. values, such as the half-cell comprised of a pure silver electrode in contact with a saturated electrolyte of AgCl and KCl may be similarly modified by an organic compound such as glycerol according to the invention, provided that the compound selected is non-reactive with any of the cell constituents over a useful range of pH of test solutions.

*Table I*

RESIDUAL LIQUID JUNCTION POTENTIALS (AT 25° C.) OF AQUEOUS SOLUTIONS SATURATED WITH KCl AND CONTAINING MODIFYING ORGANIC COMPOUNDS

| Modifying Compound | Weight Percent (KCl-free basis) | KCl concentration, mols./liter | Residual liquid junction potential, mv., in— | |
|---|---|---|---|---|
| | | | 1.0 N HCl | 1.0 N NaOH |
| — (aqueous) | | 4.24 | +11 | —11 |
| Ethylene glycol | 20 | 3.28 | +8 | —6 |
| | 40 | 2.45 | +2 | —3 |
| | 50 | 2.00 | +1 | |
| | 60 | 1.58 | —2 | +3 |
| | 80 | 1.15 | —5 | +5 |
| | 100 | 0.64 | —8 | +11 |
| Glycerol | 20 | 3.54 | +8 | |
| | 40 | 2.84 | +6 | |
| | 50 | 2.58 | +5 | +4 |
| | 60 | 2.23 | +4 | |
| | 80 | 1.62 | +2 | |
| | 100 | 1.08 | +5 | |
| Diethylene glycol | 25 | | +2 | —9 |
| | 50 | 1.91 | —8 | —6 |
| Diethylene glycol-monoethyl ether | 25 | | 0 | —10 |
| | 50 | 1.60 | —12 | —10 |

I claim:

1. A reference half-cell comprising a tubular vessel having a capillary opening at one end for flow of liquid therethrough, a reference electrode supported in said vessel, and an electrolyte liquid disposed in said vessel in contact between said opening and said reference electrode, said electrolyte liquid consisting of water, potassium chloride, and a non-ionizing soluble organic compound admixed therewith in amount sufficient to depress the freezing point of said electrolyte below —10.7° C., said compound being selected from the class of substances consisting of glycerol, ethylene glycol, diethylene glycol, and diethylene glycol mono-ethyl ether.

2. A reference half-cell as in claim 1 wherein said reference electrode comprises the system:

(mercury:mercurous chloride:bridge electrolyte)

where said bridge electrolyte comprises a saturated solution of potassium chloride in water.

3. A reference half-cell as in claim 1 wherein said reference electrode comprises the system:

(silver:silver chloride:bridge electrolyte)

where said bridge electrolyte comprises a saturated solution of potassium chloride in water.

4. A reference half-cell as in claim 2 wherein said bridge electrolyte further includes a quantity of said organic compound sufficient to depress the freezing point of the bridge electrolyte below —10.7° C.

5. A half-cell for use in determination of concentration of hydrogen ions in a substance having an ion-containing liquid portion, comprising a calomel reference electrode having a primary electrolyte saturated in potassium chloride in contact with said calomel electrode and mercurous chloride, and a secondary electrolyte in contact with said primary electrolyte adapted to contact said substance, said secondary electrolyte consisting of an admixture in water of an excess of potassium chloride and an amount of a stable soluble non-ionizing organic compound sufficient to depress the freezing point of said secondary electrolyte below —10.7° C., said compound being selected from the class of compounds consisting of glycerol, ethylene glycol, diethylene glycol and diethylene glycol mono-ethyl ether.

6. A half-cell for use in determination of concentration of hydrogen ions in a substance having an ion-containing liquid portion, comprising a silver-silver chloride reference electrode having a primary electrolyte saturated in potassium chloride and silver chloride in contact with said silver-silver chloride electrode, and a secondary electrolyte in contact with said primary electrolyte adapted to contact said substance, said secondary electrolyte consisting of an admixture in water of an excess of potassium chloride and an amount of a stable soluble non-ionizing organic compound sufficient to depress the freezing point of said secondary electrolyte below —10.7° C., said compound being selected from the class of substances consisting of glycerol, ethylene glycol, diethylene glycol and diethylene glycol mono-ethyl ether.

7. A reference electrode for the measurement of the pH of substances having an ionized liquid constituent over a range of temperatures extending from below the freezing point of a eutectic mixture of KCl and water to above the boiling point of said eutectic solution, comprising a tubular vessel of insulating material having one end closed, a mercury electrode in said closed end, and aqueous electrolyte saturated with mercurous chloride and potassium chloride filling said vessel in contact with the mercury, said electrolyte having admixed therewith a soluble organic compound selected from the group consisting of glycerol, ethylene glycol, diethylene glycol, and diethylene glycol mono-ethyl ether, in an amount ranging from about 20% to about 100% by weight of the water constituent of said electrolyte.

8. A reference electrode for the measurement of the pH of substances having an ionized liquid constituent over a range of temperatures extending from below the freezing point of a eutectic mixture of KCl and water, to above the boiling point of said eutectic solution, comprising a tubular vessel of insulating material having one end closed, a silver electrode in said closed end, and aqueous electrolyte saturated with silver chloride and potassium chloride filling said vessel in contact with the silver, said electrolyte having admixed therewith a soluble organic compound selected from the group consisting of glycerol, ethylene glycol, diethylene glycol, and diethylene glycol mono-ethyl ether, in an amount ranging from about 20% to about 100% by weight of the water constituent of said electrolyte.

9. A reference half-cell as in claim 3 wherein said bridge electrolyte further includes a quantity of said organic compound sufficient to depress the freezing point of the bridge electrolyte below −10.7° C.

References Cited in the file of this patent

UNITED STATES PATENTS

| | | |
|---|---|---|
| 1,779,232 | Handforth | Oct. 21, 1930 |
| 1,846,354 | Parker et al. | Feb. 23, 1932 |
| 2,387,313 | Wilson | Oct. 23, 1945 |
| 2,433,024 | Burgess | Dec. 23, 1947 |
| 2,755,243 | Beckman et al. | July 17, 1956 |

FOREIGN PATENTS

| | | |
|---|---|---|
| 4,467 | Great Britain | 1883 |